United States Patent
Mercer et al.

(10) Patent No.: US 10,037,014 B2
(45) Date of Patent: Jul. 31, 2018

(54) BEHAVIORAL DEMAND RESPONSE DISPATCH

(71) Applicant: Opower, Inc., Arlington, VA (US)

(72) Inventors: Tom Mercer, San Francisco, CA (US); Alessandro Orfei, San Francisco, CA (US); Elisabeth Boonin, San Francisco, CA (US)

(73) Assignee: OPOWER, INC., Arlington, VA (US)

( * ) Notice: Subject to any disclaimer, the term of this patent is extended or adjusted under 35 U.S.C. 154(b) by 360 days.

(21) Appl. No.: 14/581,765

(22) Filed: Dec. 23, 2014

(65) Prior Publication Data
US 2015/0227846 A1 Aug. 13, 2015

Related U.S. Application Data

(60) Provisional application No. 61/937,263, filed on Feb. 7, 2014.

(51) Int. Cl.
*G05B 17/02* (2006.01)
*G05B 15/02* (2006.01)
(Continued)

(52) U.S. Cl.
CPC ............ *G05B 17/02* (2013.01); *G05B 15/02* (2013.01); *G05B 19/048* (2013.01); *G05F 1/66* (2013.01);
(Continued)

(58) Field of Classification Search
CPC ...... G05B 17/02; G05B 15/02; G05B 19/048; G05B 2219/2639; G05B 2219/2642;
(Continued)

(56) References Cited

U.S. PATENT DOCUMENTS 4,334,275 A 6/1982 Levine
4,843,575 A 6/1989 Crane
(Continued)

FOREIGN PATENT DOCUMENTS

AU 2010315015 7/2014
CA 2779754 5/2011
(Continued)

OTHER PUBLICATIONS

Steel et al., "On the web's cutting edge, anonymity in name only", Aug. 4, 2010, Wall Street Journal.*
(Continued)

*Primary Examiner* — Crystal J Barnes-Bullock
(74) *Attorney, Agent, or Firm* — Cooper Legal Group, Inc.

(57) ABSTRACT

The subject disclosure relates to computer-implemented methods that include steps for receiving a reduction request, the reduction request indicating a desired amount of a consumable resource for which consumption is to be reduced, receiving a population indicator, the population indicator defining a set of consumers associated with the reduction request, and determining, using a behavioral demand dispatch (BDD) model, one or more target users from among the set of consumers. In certain aspects, the steps can further include providing a demand reduction communication to each of the one or more target users. Systems and computer readable media are also provided.

20 Claims, 5 Drawing Sheets

(51) Int. Cl.
*G05B 19/048* (2006.01)
*G05F 1/66* (2006.01)
*G06Q 50/06* (2012.01)
*G06Q 10/04* (2012.01)

(52) U.S. Cl.
CPC .............. *G06Q 10/04* (2013.01); *G06Q 50/06* (2013.01); *G05B 2219/2639* (2013.01); *G05B 2219/2642* (2013.01); *Y02B 70/3225* (2013.01); *Y04S 20/222* (2013.01)

(58) Field of Classification Search
CPC .......... G05F 1/66; G06Q 10/04; G06Q 50/06; H02J 3/14; H02J 3/28; H02J 13/001; H02J 13/0062; H02J 2003/003; H02J 2003/007; H02J 2003/146; Y02B 70/3216; Y02B 70/3225; Y02B 70/3241; Y04S 20/221; Y04S 20/222; Y04S 20/224; Y04S 20/227
USPC .......................................................... 700/295
See application file for complete search history.

(56) References Cited

U.S. PATENT DOCUMENTS

| | | | |
|---|---|---|---|
| 5,513,519 | A | 5/1996 | Cauger et al. |
| 5,566,084 | A | 10/1996 | Cmar |
| 5,717,609 | A | 2/1998 | Packa et al. |
| 5,855,011 | A | 12/1998 | Tatsuoka |
| 5,873,251 | A | 2/1999 | Iino |
| 5,930,773 | A | 7/1999 | Crooks et al. |
| 5,948,303 | A | 9/1999 | Larson |
| 6,035,285 | A | 3/2000 | Schlect et al. |
| 6,088,688 | A | 7/2000 | Crooks et al. |
| 6,295,504 | B1 | 9/2001 | Ye et al. |
| 6,327,605 | B2 | 12/2001 | Arakawa et al. |
| 6,701,298 | B1 | 3/2004 | Jutsen |
| 6,732,055 | B2 | 5/2004 | Bagepalli et al. |
| 6,778,945 | B2 | 8/2004 | Chassin et al. |
| 6,785,620 | B2 | 8/2004 | Kishlock et al. |
| 6,972,660 | B1 | 12/2005 | Montgomery, Jr. et al. |
| 7,020,508 | B2 | 3/2006 | Stivoric et al. |
| 7,073,073 | B1 | 7/2006 | Nonaka et al. |
| 7,073,075 | B2 | 7/2006 | Freyman et al. |
| 7,136,710 | B1 | 11/2006 | Hoffberg et al. |
| 7,142,949 | B2 | 11/2006 | Brewster et al. |
| 7,149,727 | B1 | 12/2006 | Nicholls et al. |
| 7,200,468 | B2 | 4/2007 | Ruhnke et al. |
| 7,243,044 | B2 | 7/2007 | McCalla |
| 7,333,880 | B2 | 2/2008 | Brewster et al. |
| 7,356,548 | B1 | 4/2008 | Culp et al. |
| 7,444,251 | B2 | 10/2008 | Nikovski et al. |
| 7,460,502 | B2 | 12/2008 | Arima et al. |
| 7,460,899 | B2 | 12/2008 | Almen |
| 7,552,030 | B2 | 6/2009 | Guralnik et al. |
| 7,561,977 | B2 | 7/2009 | Horst et al. |
| 7,991,513 | B2 | 8/2011 | Pitt |
| 8,065,098 | B2 | 11/2011 | Gautam |
| 8,166,047 | B1 | 4/2012 | Cohen et al. |
| 8,180,591 | B2 | 5/2012 | Yuen et al. |
| 8,239,178 | B2 | 8/2012 | Gray et al. |
| D667,841 | S | 9/2012 | Rai et al. |
| 8,260,468 | B2 | 9/2012 | Ippolito et al. |
| 8,275,635 | B2 | 9/2012 | Stivoric et al. |
| 8,280,536 | B1 | 10/2012 | Fadell et al. |
| 8,348,840 | B2 | 1/2013 | Heit et al. |
| 8,375,118 | B2 | 2/2013 | Hao et al. |
| 8,417,061 | B2 | 4/2013 | Kennedy et al. |
| 8,429,630 | B2 | 4/2013 | Nickolov et al. |
| 8,478,447 | B2 | 7/2013 | Fadell et al. |
| 8,489,245 | B2* | 7/2013 | Carrel ..................... 700/286 |
| 8,583,288 | B1 | 11/2013 | Rossi et al. |
| 8,630,741 | B2 | 1/2014 | Matsuoka et al. |
| 8,660,813 | B2 | 2/2014 | Curtis et al. |
| 8,690,751 | B2 | 4/2014 | Auphan |
| D707,245 | S | 6/2014 | Bruck et al. |
| 8,751,432 | B2 | 6/2014 | Berg-Sonne et al. |
| D710,871 | S | 8/2014 | McCormack et al. |
| 8,805,000 | B2 | 8/2014 | Derby et al. |
| D714,335 | S | 9/2014 | Cojuangco et al. |
| D729,268 | S | 5/2015 | Nies et al. |
| 9,031,703 | B2 | 5/2015 | Nakamura et al. |
| D740,847 | S | 10/2015 | Yampolskiy et al. |
| 2001/0047290 | A1 | 11/2001 | Petras et al. |
| 2002/0065581 | A1 | 5/2002 | Fasca |
| 2002/0178047 | A1 | 11/2002 | Or et al. |
| 2002/0198629 | A1 | 12/2002 | Ellis |
| 2003/0011486 | A1 | 1/2003 | Ying |
| 2003/0018517 | A1 | 1/2003 | Dull et al. |
| 2003/0023467 | A1 | 1/2003 | Moldovan |
| 2003/0216971 | A1 | 11/2003 | Sick et al. |
| 2004/0024717 | A1 | 2/2004 | Sneeringer |
| 2004/0111410 | A1 | 6/2004 | Burgoon et al. |
| 2004/0140908 | A1 | 7/2004 | Gladwin et al. |
| 2005/0257540 | A1 | 11/2005 | Choi et al. |
| 2006/0089851 | A1 | 4/2006 | Silby et al. |
| 2006/0103549 | A1 | 5/2006 | Hunt et al. |
| 2006/0195438 | A1 | 8/2006 | Galuten |
| 2006/0240803 | A1* | 10/2006 | Valeriano ................ H04L 41/06 455/412.1 |
| 2006/0246968 | A1 | 11/2006 | Dyke-Wells |
| 2007/0061735 | A1 | 3/2007 | Hoffberg et al. |
| 2007/0203860 | A1 | 8/2007 | Golden et al. |
| 2007/0213992 | A1 | 9/2007 | Anderson et al. |
| 2007/0255457 | A1 | 11/2007 | Whitcomb et al. |
| 2007/0260405 | A1 | 11/2007 | McConnell et al. |
| 2008/0027885 | A1 | 1/2008 | van Putten et al. |
| 2008/0167535 | A1 | 7/2008 | Stivoric et al. |
| 2008/0195561 | A1 | 8/2008 | Herzig |
| 2008/0244429 | A1 | 10/2008 | Stading |
| 2008/0281473 | A1 | 11/2008 | Pitt |
| 2008/0281763 | A1 | 11/2008 | Yliniemi |
| 2008/0304112 | A1 | 12/2008 | Matsuno |
| 2008/0306985 | A1 | 12/2008 | Murray et al. |
| 2009/0106202 | A1 | 4/2009 | Mizrahi |
| 2009/0106674 | A1 | 4/2009 | Bray et al. |
| 2009/0204267 | A1 | 8/2009 | Sustaeta et al. |
| 2009/0217175 | A1 | 8/2009 | Bechtel et al. |
| 2009/0217179 | A1 | 8/2009 | Mons et al. |
| 2009/0326726 | A1 | 12/2009 | Ippolito et al. |
| 2010/0004790 | A1* | 1/2010 | Harbin, III .......... F24D 19/1051 700/291 |
| 2010/0025483 | A1 | 2/2010 | Hoeynck et al. |
| 2010/0076835 | A1 | 3/2010 | Silverman |
| 2010/0082174 | A1 | 4/2010 | Weaver |
| 2010/0099954 | A1 | 4/2010 | Dickinson et al. |
| 2010/0138363 | A1 | 6/2010 | Batterberry et al. |
| 2010/0156665 | A1 | 6/2010 | Krzyzanowski et al. |
| 2010/0179704 | A1 | 7/2010 | Ozog |
| 2010/0198713 | A1 | 8/2010 | Forbes, Jr. et al. |
| 2010/0217452 | A1 | 8/2010 | McCord et al. |
| 2010/0217549 | A1 | 8/2010 | Galvin et al. |
| 2010/0217550 | A1 | 8/2010 | Crabtree et al. |
| 2010/0217642 | A1 | 8/2010 | Crubtree et al. |
| 2010/0217651 | A1 | 8/2010 | Crabtree et al. |
| 2010/0232671 | A1 | 9/2010 | Dam et al. |
| 2010/0241648 | A1 | 9/2010 | Ito et al. |
| 2010/0286937 | A1 | 11/2010 | Hedley et al. |
| 2010/0289643 | A1 | 11/2010 | Trundle et al. |
| 2010/0292856 | A1* | 11/2010 | Fujita ..................... G06Q 10/04 700/291 |
| 2010/0324962 | A1 | 12/2010 | Nesler et al. |
| 2010/0332373 | A1 | 12/2010 | Crabtree et al. |
| 2011/0022429 | A1 | 1/2011 | Yates et al. |
| 2011/0023045 | A1 | 1/2011 | Yates et al. |
| 2011/0040666 | A1 | 2/2011 | Crabtree et al. |
| 2011/0061014 | A1 | 3/2011 | Frader-Thompson et al. |
| 2011/0063126 | A1 | 3/2011 | Kennedy et al. |
| 2011/0106316 | A1 | 5/2011 | Drew et al. |
| 2011/0106328 | A1 | 5/2011 | Zhou et al. |
| 2011/0106471 | A1 | 5/2011 | Curtis et al. |
| 2011/0153102 | A1 | 6/2011 | Tyagi et al. |
| 2011/0178842 | A1 | 7/2011 | Rane et al. |

(56) References Cited

U.S. PATENT DOCUMENTS

| | | |
|---|---|---|
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0022700 A1* | 1/2012 | Drees ............ G05B 15/02 700/276 |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0078434 A1* | 3/2012 | Hindi ............ H02J 3/14 700/296 |
| 2012/0084063 A1 | 4/2012 | Drees et al. |
| 2012/0179692 A1 | 7/2012 | Hsiao et al. |
| 2012/0215369 A1 | 8/2012 | Desai et al. |
| 2012/0216123 A1 | 8/2012 | Shklovskii et al. |
| 2012/0259583 A1* | 10/2012 | Noboa ............ G05B 15/02 702/179 |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0073105 A1* | 3/2013 | Schmid ............ H02J 3/382 700/295 |
| 2013/0097481 A1 | 4/2013 | Kotler et al. |
| 2013/0173064 A1 | 7/2013 | Fadell et al. |
| 2013/0253709 A1 | 9/2013 | Renggli et al. |
| 2013/0254151 A1* | 9/2013 | Mohagheghi ...... G06Q 30/0621 706/46 |
| 2013/0261799 A1 | 10/2013 | Kuhlmann et al. |
| 2013/0262040 A1 | 10/2013 | Buckley |
| 2013/0282181 A1* | 10/2013 | Lu ............ H02J 3/14 700/275 |
| 2013/0345884 A1* | 12/2013 | Forbes, Jr. ........ G05B 15/02 700/286 |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0278687 A1* | 9/2014 | McConky ........ G06Q 10/06312 705/7.22 |
| 2014/0337107 A1 | 11/2014 | Foster |
| 2015/0012147 A1* | 1/2015 | Haghighat-Kashani ............ G06Q 30/02 700/291 |
| 2015/0134280 A1* | 5/2015 | Narayan ............ G06Q 10/04 702/62 |
| 2015/0227522 A1 | 8/2015 | O'Donnell et al. |
| 2015/0254246 A1 | 9/2015 | Sheth et al. |
| 2015/0267935 A1 | 9/2015 | Devenish et al. |
| 2015/0269664 A1 | 9/2015 | Davidson |
| 2015/0310019 A1 | 10/2015 | Royer et al. |
| 2015/0310463 A1 | 10/2015 | Turfboer et al. |
| 2015/0310465 A1 | 10/2015 | Chan et al. |
| 2015/0324819 A1 | 11/2015 | Lin et al. |
| 2015/0326679 A1 | 11/2015 | Lin et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Search Report and Written Opinion for PCT Application No. PCT/US2015/038692, dated Sep. 24, 2015, 13 pages.
International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May, 19,2008, 15 pages, available at http://web.archive.orgi/web/20080519220643/bie.berkeley.edu/collcale/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.

(56) References Cited

OTHER PUBLICATIONS

Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "Prism: An Introduction," Elsevier Sequoia, Energy and Buildings, vol. 9, pp. 5-18, 1986.
Fels, Margaret F., et al., Seasonality of Non-heating Consumption and Its effect on Prism Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of Prism Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study-Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f.. uelband, 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
244. Wikipedia, "Mixture model," 10 pages, Oct. 7, 2012.

* cited by examiner

BEHAVIORAL DEMAND RESPONSE DISPATCH

CROSS-REFERENCE TO RELATED APPLICATIONS

This application claims priority to and the benefit of U.S. Provisional Patent Application No. 61/937,263, filed on Feb. 7, 2014, the disclosure of which is incorporated by reference herein in its entirety.

BACKGROUND

1. Technical Field

The subject technology relates to methods and systems for creating and implementing a behavioral demand response dispatch (BDRD) model and in particular, provides methods and systems for reducing resource consumption by predetermined amounts using a BDRD model.

2. Introduction

As the demand for electricity increases worldwide, meeting the demand has become more expensive. One way to meet energy demands is to find alternative energy sources, the importance of which has become increasingly important. Efforts to reduce electricity consumption have motivated advances in energy efficiency and demand response, such as novel ways for inducing power consumption reductions.

SUMMARY

In certain aspects, the disclosed subject matter relates to a computer-implemented method for providing behavioral demand response dispatch notifications. The computer-implemented method can include steps for receiving a reduction request, the reduction request indicating a desired amount of a consumable resource for which consumption is to be reduced, receiving a population indicator, the population indicator defining a set of consumers associated with the reduction request, and determining, using a behavioral demand response dispatch (BDRD) model, one or more target users from among the set of consumers. In some aspects, the method can further include steps for providing a targeted, personalized communication to each of the one or more target users.

In another aspect, the subject technology relates to behavioral demand response dispatch systems including one or more processors, and a computer-readable medium comprising instructions stored therein, which when executed by the processors, cause the processors to perform operations including: receiving a reduction request indicating a desired amount of a consumable resource for which consumption is to be reduced, receiving a population indicator, the population indicator defining a set of consumers associated with the reduction request, and receiving preference information associated with one or more users from among the set of consumers associated with the reduction request. In certain aspects the processors can be further configured to execute operations for providing, using a behavioral demand response dispatch (BDRD) model, a demand reduction communication to one or more target users from among the set of consumers associated with the reduction request.

In yet another aspect, the disclosed subject matter relates to a computer-readable medium comprising instructions stored therein, which when executed by one or more processor(s), cause the processor(s) to perform operations including: receiving a reduction request indicating a desired amount of a consumable resource for which consumption is to be reduced, receiving a population indicator, the population indicator defining a set of consumers associated with the reduction request and receiving preference information associated with one or more users from among the set of consumers associated with the reduction request. In some implementations, the computer-readable medium may further include instructions for providing, using a behavioral demand dispatch (BDD) model, a demand reduction communication to one or more target users.

It is understood that other configurations of the subject technology will become readily apparent to those skilled in the art from the following detailed description, wherein various configurations of the subject technology are shown and described by way of illustration. The subject technology is capable of other and different configurations and its several details are capable of modification in various respects without departing from the scope of the subject technology. Accordingly, the detailed description and drawings are to be regarded as illustrative and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
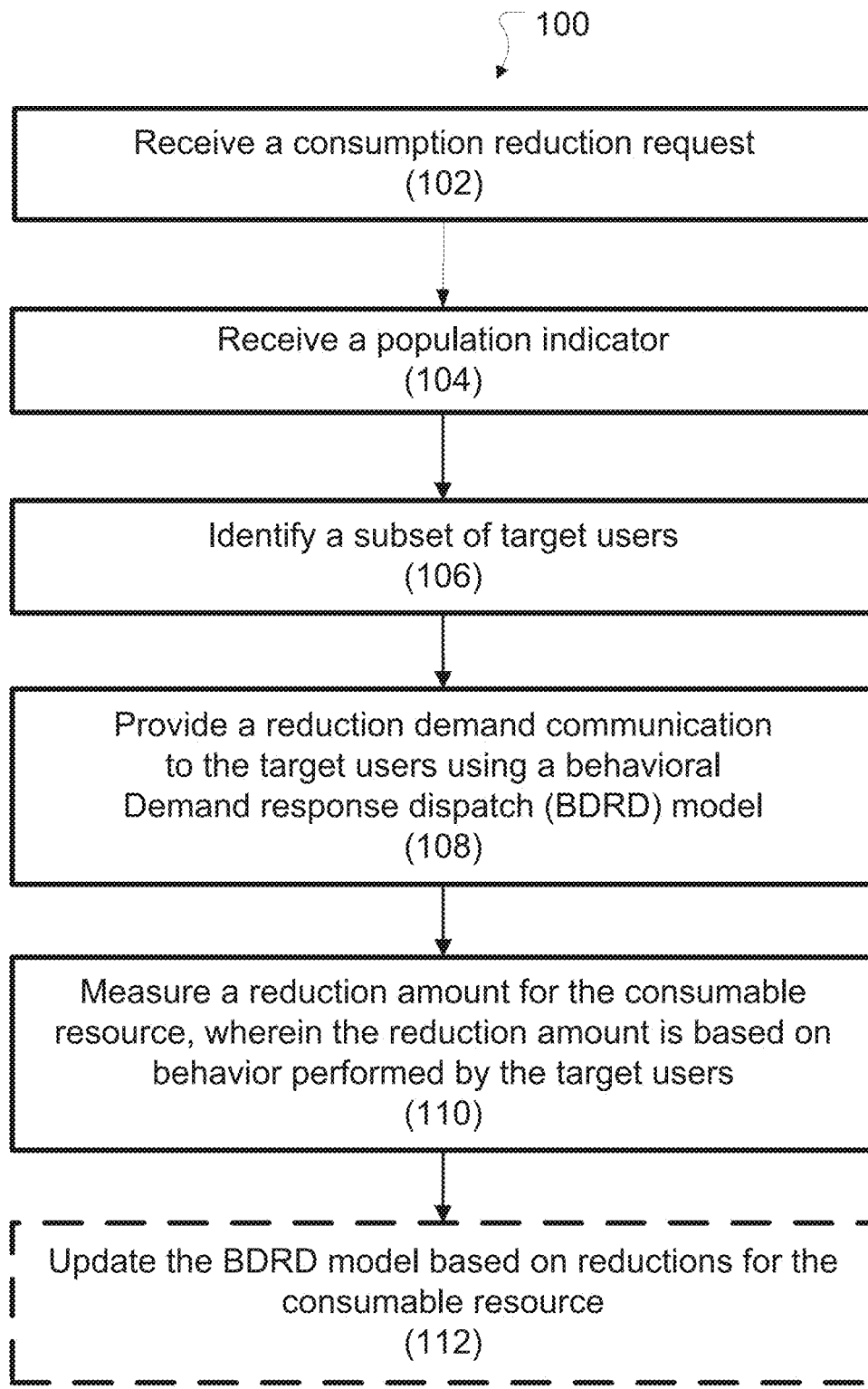
FIG. 1 illustrates steps of an example method for implementing a BDR dispatch model, according to certain aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

When aggregated over a large number of consuming entities (e.g., power consumers or users/customers), resource consumption reductions can be treated as a generated resource. As applied to energy consumption, predictive reductions in energy use can therefore be treated as an alternative energy resource. As used herein, Demand Response (DR) approaches include conservation techniques in which a controlling authority (such as a commodity provider/utility), is given control over resource consumption through the ability to directly control one or more consuming devices. By way of example, in some DR implementations, a utility provider is granted control over power consumption capabilities for individual customers, e.g., through the ability to down-regulate consumption of particular appliances or devices. In contrast, Behavioral Demand Response (BDR) relates to changes in the resource consumption of end-use customers that is controlled by inducing changes in customer behavior.

Traditional DR methodologies are sometimes implemented by consolidating control over power consuming appliances with centralized control stations. In such implementations, consumption is controlled at some specified resolution (e.g., on a household-by-household basis) by enabling the controlling entity to directly monitor/control the consuming appliance/s. The centralized control of power consuming appliances enables the to accurate prediction and management of consumption reduction amounts. Although DR implementations provide certain advantages (e.g., highly predictability in consumption reduction amounts), many users/consumers are reluctant to abdicate control over their power use to an outside party. In contrast, behavioral demand response techniques keeps control over power use in the hands of the users/consumers and instead encourages the users/consumers to reduce consumption. However these BDR techniques are associated with the technical limitation of not having any infrastructure able to directly measure, predict, or manage the reduction of consumption.

The subject technology addresses the limitations of DR techniques by providing ways that consumption reduction can be achieved using behavioral demand techniques. In some approaches, a behavioral demand response dispatch (BDRD) model is used to serve precise consumption reductions using individually targeted dispatch communications. That is, aspects of the subject technology can help translate voluntary individual actions or behaviors into reliable and accurate reductions in resource consumption. Although many of the following design implementations and examples are provided in the context of electric power conservation, it is understood that other applications may be realized without departing from the scope of the invention. That is, the BDRD techniques disclosed herein can be applied to the reduction of any consumable resource, without departing from the scope of the subject invention.

The behavioral demand response dispatch implementations of the subject invention allow for the receipt of a precise resource reduction request, "reduction request." Based on the reduction request, the BDRD model can provide behavioral demand response (BDR) notifications to one or more individuals in a target population group. Although each notification may be different and customized to a particular recipient, the goal of the notification is to incentivize the recipient to reduce his/her energy consumption during a particular envelope of time. Thus, robust BDRD model implementations can accurately serve consumption reductions via behavioral change, without the need/ability to directly control power consuming devices or appliances. As discussed in further detail below, some resource reduction requests may be accompanied by an acceptable error threshold amount. Thus, if the resource reduction cannot be accurately/reliably served within an acceptable error margin, no notifications may be sent. Alternatively, depending on the accuracy of the actual resource reduction, the BDRD model may be updated (e.g., using a machine-learning process), increasing the robustness/accuracy of the BDRD model over time.

A BDRD model can be constructed, initialized and updated in various ways, using different types of information. In some aspects, a machine-learning approach is used to train/update a BDRD regression model that is configured to self-adapt as new data and examples are provided. A BDRD model can be constructed using data for known behavioral demand response scenarios, such as that collected for historic behavioral demand response trials, together with energy consumption data (e.g., provided as load curves or raw consumption data). Such data can include, but are not limited to, one or more of: power consumption amount/s, heating/cooling profiles, communication channel type/s, communication content type/s, geographic location/s and/or weather data. The BDRD model can also be further based on consumer and/or household specific demographic data for one or more resource consuming entities. Such data can include, but are not limited to: residence type (e.g., apartment, condominium, or townhome, etc.), residence size, income, stated communication preferences (e.g., mailers, email, text messages, etc.) and/or historic consumption information.

The BDRD model can be used to accurately and reliably reduce resource usage by predetermined amounts. As mentioned above, a tolerance may be specified, such that the BDRD model does not over/under reduce resource consumption, for example, beyond a predefined error threshold.

Once implemented, the BDRD model can be used to facilitate the generation and dispatch of consumer communications that can, in the aggregate, reliably and accurately reduce resource consumption (such as power consumption) for a given population or set of consuming entities (e.g., households and/or businesses). As discussed in further detail below, accurate and reliable consumption reductions can enable resource providers to more efficiently predict future demand, as well as effectively manage the need to provision supplemental power generation.

FIG. 1 illustrates steps of an example method 100 that can be performed to implement a BDRD model, according to some aspects of the technology. Method 100 begins with step 102, in which a consumption reduction request is received, for example, at a BDRD system. At a minimum, the consumption reduction request specifies a desired resource amount (e.g., power) for which consumption is to be reduced. Depending on implementation, the consumption request can include or be accompanied with, other types of information, such as a specified geographic region (in with the reduction is to occur), a time period for the reduction, and/or a tolerance value indicating an acceptable error margin, e.g., by which the resulting reduction may vary.

By way of example, a utility company wishing to reduce a power load on an electric grid at a peak consumption period may issue a reduction request to BDRD provider. The reduction request can indicate how much power needs to be conserved, as well as other information including a time period, and an acceptable error margin. In some implementations, "on-demand" behavioral demand response based consumption reductions can help utilities to save money by avoiding the need for emergency/auxiliary power generation. In turn, the reduction request is provided to the BDRD model so that various aspects of the dispatch can be determined. Such aspects can include: (1) an identification of relevant target customers that may be contacted, (2) a determination of available or preferred communication channels (for each target customer), and (3) a selection of notification content for each target customer.

In step 104, a population indicator is received (e.g., by a BDR dispatch system). Depending on implementation, the population indicator provides various types of information about the entities/users for which a communication dispatch is to be sent, e.g., to service the reduction request from step 102. The population indicator can include information that identifies relevant customers for which BDR dispatch communications may be sent. As such, the population indicator can be based on multiple factors, including a minimum number or arrangement of customers that may be required to satisfy the reduction request, and/or privacy considerations pertaining to one or more of those customers.

By way of example, the population indicator may provide identifying and/or contact information for only those customers that are actively enrolled in a BDR program, or that have indicated (e.g., "opted into") an energy savings program in which they have agreed to be contacted. Alternatively, the population indicator may merely define a list of entities/consumers for which behavioral responses are necessary to achieve a target reduction consistent with the reduction request.

In step 106, a subset of target users are identified using the BDRD model. The target users are selected from a subset of users/entities identified by the population indicator provided in step 104. In some aspects, the BDRD model is used to analyze the entities/users defined by the population indicator to identify target users to whom dispatch notifications can be sent, e.g., to service the reduction request. Identification of the target users based on the BDRD model can be based on multiple factors that influence various weights of the BDRD regression model.

By way of example, the target users may be identified/selected based on one or more reliability indications suggesting that the selected target users have a relative high-likelihood of responding to a conservation dispatch communication, and/or that the respective consumption reductions of the target users are sufficient to achieve the reduction request, i.e., within an acceptable error parameter.

In step 108, a demand reduction communication is provided to the target users using the BDRD model. Depending on implementation, the BDRD model can be used to do one or more of: generate targeted demand reduction communications (e.g., for one or more specific user), select an appropriate communication channel, e.g., email, SMS, telephone dispatch, physical mailer, etc. for the respective target user, and/or determine a timing of the sending/arrival of the demand reduction communication.

The BDRD model can also be used to select from among one or more time periods in which an associated customer is provided with a dispatch notification. For example, a first customer may be provided a dispatch notification to incent them to reduce consumption at a first time (e.g., between 1-4 PM), whereas a second customer may be provided with a different dispatch notification to incent them to reduce consumption at a second time (e.g., between 4-7 PM).

In step 110, a reduction amount for the consumable resource (e.g., based on the demand reduction communication of step 108), is measured to determine the efficacy of the demand reduction communication of step 108. In some approaches, wherein the BDRD is implemented as a machine-learning regression model, measurements of consumption reductions can be used as feedback (e.g., for the underlying neural network or machine-learning algorithm).

Although the reduction amount may be essentially any amount of consumable resource for which a reduction is desired, in some aspects, the reduction amount will correspond with a resource consumption reduction (e.g., power reduction) that would be necessary to avoid over-strain on the electric grid. By preventing scenarios in which auxiliary power stations are needed, utilities may save considerable resources by achieving accurate and sufficient reductions in power consumption, for example, on peak-demand days.

In optional step 112, the BDRD model is modified/updated based on the measurements of step 110. By way of example, the measurements can be used to modify one or more approximation functions used in the BDRD model.

Figure 2:
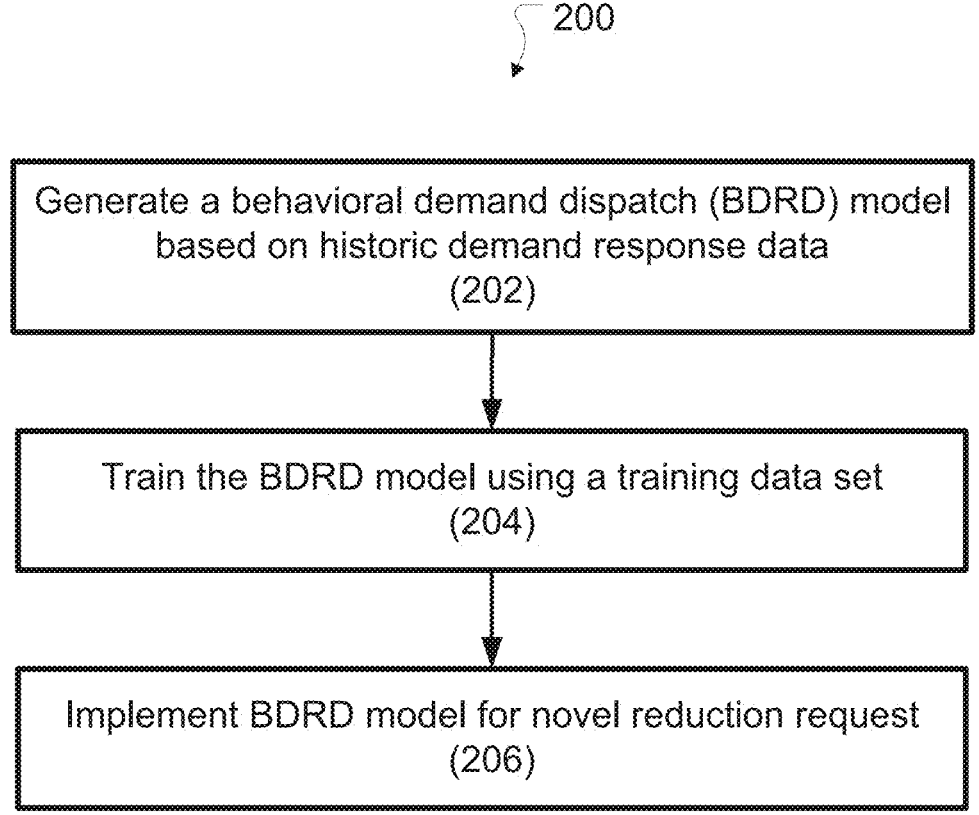
FIG. 2 illustrates steps of an example method for creating or generating a BDR dispatch model, according to some aspects of the technology.

FIG. 2 illustrates steps of an example method for creating or generating a BDRD model, according to some aspects. Method 200 begins with step 202, in which an (initial) BDRD model is created based on historic demand response data. Historic demand response data can provide indications as to various aspects of behavioral demand response that may be used to form the basic architecture of the initial BDRD model.

By way of example, historic demand response data can provide evidence as to how resource (power) consumption has been historically effected by different variables such as: communication content, communication delivery type (e.g., email, telephone outreach, SMS, mailer, etc.), weather, time of day/year, time delay duration between notification delivery and targeted demand response time, etc.

Other various types of data may also be used to create the initial BDRD model. For example, demographic information about the recipients (e.g., entities, individual or users) may be used. Although the types of demographic information can depend on information availability and the particular BDRD model implementation, examples of demographic information can include: location, income, education, housing type, solar panel ownership status, electric vehicle ownership status, etc.

In step 204, the BDRD model is further tuned or "trained" using a training data set that includes historic behavioral demand response examples. By way of example, a requested reduction amount can be provided to the BDRD model and the corresponding output (e.g., dispatch notifications) can be compared against one or more historic dispatch notifications determined to have accurately achieved the requested reduction amount, for example, within a desired error tolerance interval. In this manner, training data can be used to provide examples and feedback to the BDRD model before the model is implemented with "live" data for which resultant measurements are yet unknown. Once the BDRD model has been sufficiently trained, i.e., exposed or provided an adequate amount of training data, the model can be used to receive new requests for which resulting reduction information is unknown.

An amount by which training data may be used to update or modify the BDRD model may depend on how closely (or accurately) a particular dispatch was able to achieve the reduction request. By way of example, an actual reduction amount deviating greatly from the requested reduction may cause a more significant change to one or more weights in the BDRD model, as compared to an actual reduction amount that was somewhat close to the requested reduction.

Figure 3:
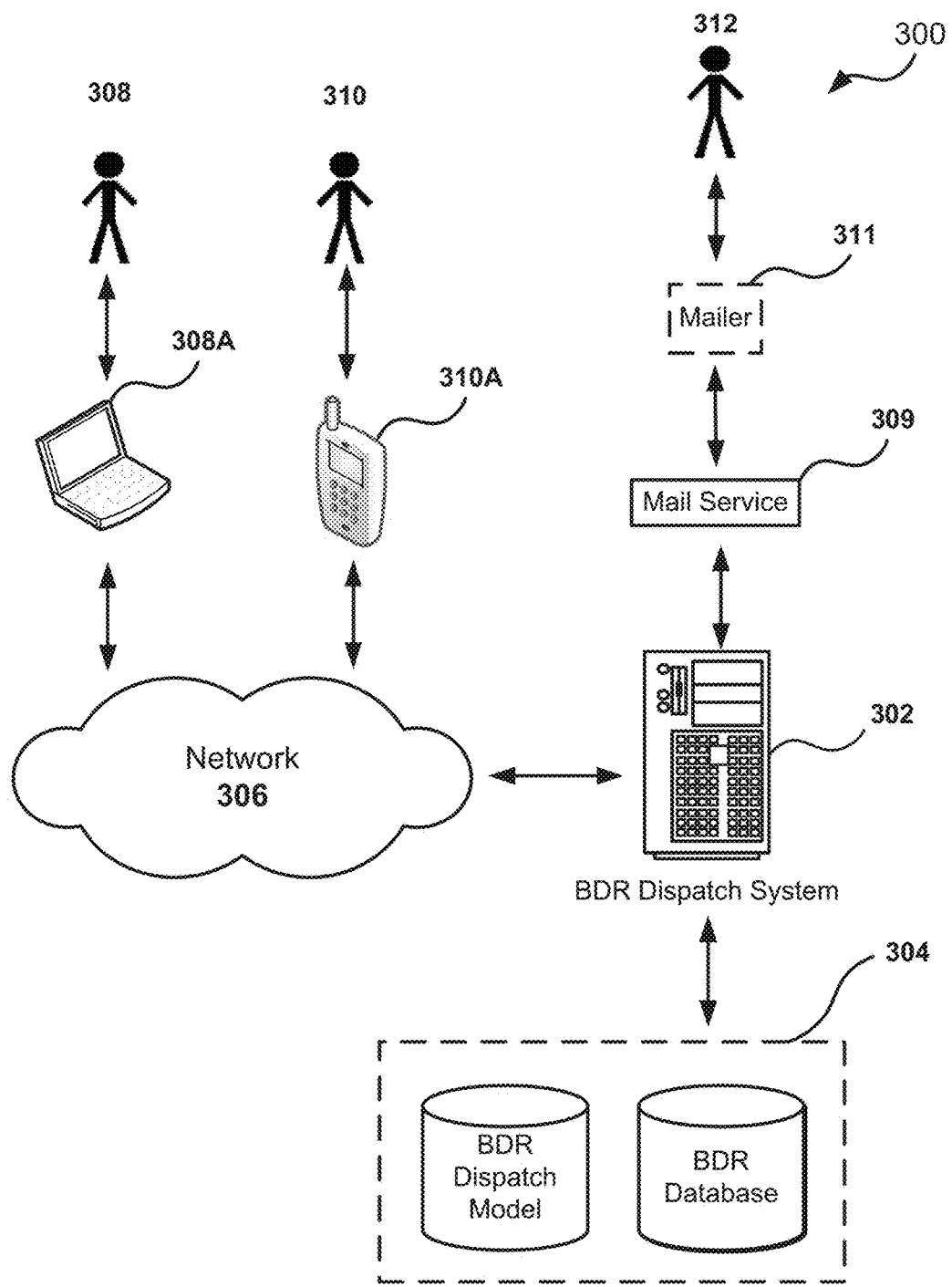
FIG. 3 conceptually illustrates and example of a dispatch system that is configured to implement a BDRD model, according to some aspects of the technology.

FIG. 3 illustrates an example dispatch environment 300 that can be used to implement a BDR dispatch system 302, according to some aspects of the technology. Environment 300 includes dispatch system 302, which includes modules 304 (e.g., software and/or hardware modules) for storing a BDR Dispatch Model and BDR Database.

In order to provide notification dispatch services, dispatch system 302 is coupled to various components for delivering notifications to one or more of users 308, 310 and/or 312. In the illustrated example, dispatch system 302 is coupled to network 306, which in turn is connected to each of user devices 308A and 310A, associated with users 308 and 310, respectively. To facilitate the sending of physical mailers, BDR dispatch system 302 is also communicatively coupled to mail service 309, for example for producing and/or sending physical mailer 311 to user 312. Mail system 306 can represent a service for either producing physical notifications (e.g., by printing/collating mail notifications for various customers) and/or may represent a mail carrier or delivery service.

It is understood that BDR dispatch system 302 may be implemented using one or more computers, servers and/or processing device/s connected over a network, e.g., a local area network (LAN), a wide area network (WAN), or a network of networks, such as the Internet. Similarly, network 306 can represent any geographically centric interconnection of devices, or a geographically disparate interconnection of computers, such as the Internet. As such, network 306 can include a variety of publicly and/or privately switched networks, such as cellular telephone network/s and/or publicly operated telephone service/s.

In practice, BDR dispatch system 302 can be used to issue BDR notifications in response to a reduction request, for example, that is received from a utility customer (not illustrated). As discussed above, the BDR Dispatch Model may be used to determine a variety of variables relating to the dispatch of BDR notifications. For example, BDR Dispatch Model can be used to identify users to whom notifications are to be sent, generate personalized BDR notifications for each customer, select communication channels for delivery, and transmit/send the BDR notifications.

Resource reduction requests can be accompanied by information defining a set of customers/consumers that can be contacted. Factors determining whether or not a particular customer can be sent BDR notifications can vary with implementation. For example, before a customer may be contacted, he/she may first need to give permission, or otherwise "opt-in" to a service or program in which BDR notifications are delivered as a matter of course.

Once a contactable set of customers are identified, a subset of those customers can be identified by the BDR model, for example, to determine which customers should receive BDR notifications in order to achieve the received reduction request. By way of example, there may exist a large population of customers for which notifications may be delivered, however the amount of energy to be reduced, as specified by the reduction request, may be relatively low. Consequently, only a small fraction of total contactable customers may need to be provided with BDR notifications to achieve the desired reduction. Alternatively, for a larger request a majority (or all) of the available customers may need to be contacted.

The BDR dispatch model of BDR dispatch system 302 can also be used to identify one or more communication channels through which an associated customer may be contacted. In some instances, a customer may be reachable via only one communication channel; however, some customers may be reachable via multiple channels (e.g., SMS and email, etc.). In the latter case, the BDR dispatch model can be configured to select the proper communication channel for each corresponding customer.

Communication channel determinations may be based on an associated contact quality indicator, for example, indicating that the communication channel information (e.g., physical address, email address, telephone number, and/or SMS message) is reliable, i.e., communications over which are likely to reach the intended customer. Such indications may be based on historic information indicating whether or not contact has been confirmed with the customer via a particular channel and/or whether the contact information was explicitly provided by the customer, etc. Customer contact information and/or contact information quality indicator information may be stored in the BDRD Data volume in modules 304.

As discussed above, once the BDR dispatch model has been used to identify the set of customers for which notifications are to be provided, as well as which communications channels are used for the dispatch, the model may also be used to formulate individualized BDR notification content. Such formulations can be based on historic customer use data and/or demographic data, for example, stored in a database in modules 304. Once notification content has been generated, BDRD system 302 can execute the dispatch, for example, to one or more of customers 308, 310 and/or 312, using an associated communication path.

Further to the example of FIG. 3, customers 308 and 310 can be contacted on devices 308A and 310A, respective (i.e., using network 306). In contrast, customer 312 can be contacted using a physical mailer, for example provided by mail service 309.

In some aspects, physical mailers may be used to provide follow up communications, and/or feedback relating to a previous BDR dispatch notification. By way of example, a dispatch notification sent via email may be later followed with a physical mailer, e.g., to provide additional information and/or incentives to the receiving customer.

Figure 4:
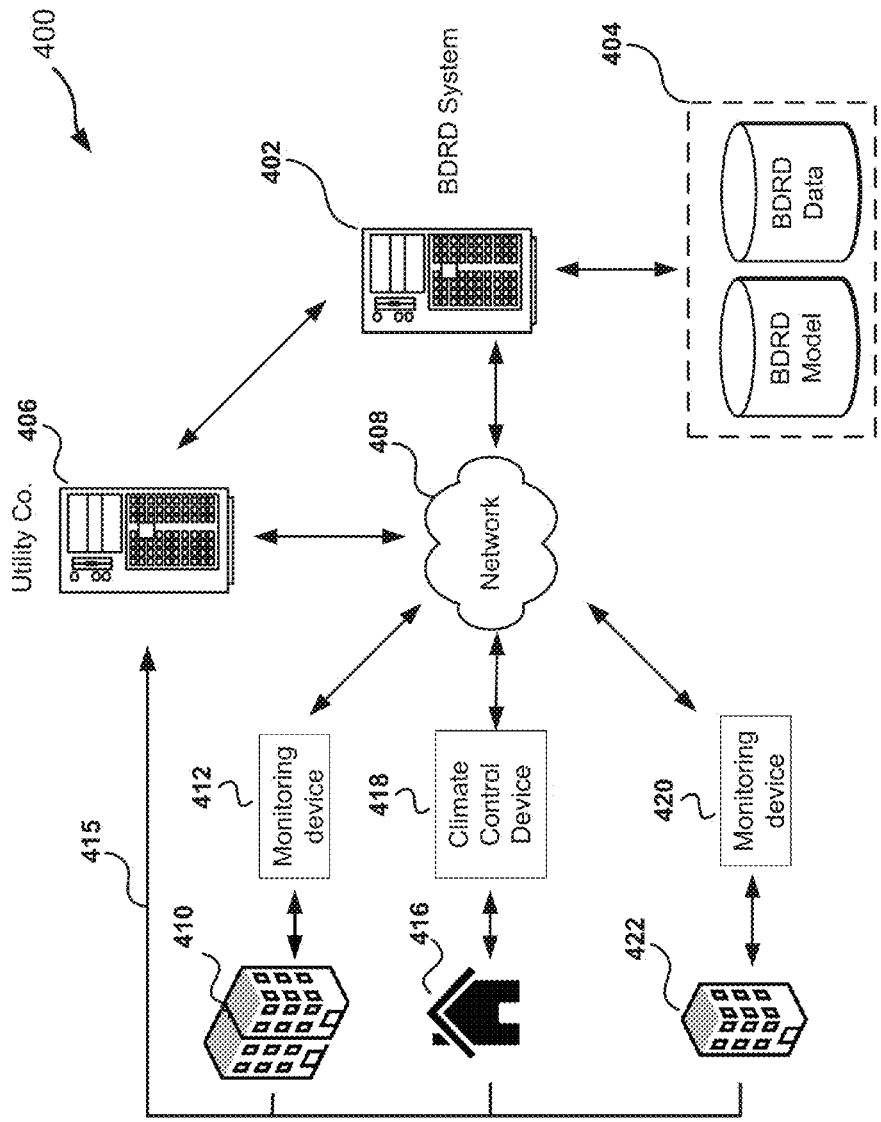
FIG. 4 illustrates an example of an environment in which a BDR system can be configured to receive reduction requests and/or collect usage data from resource consumers, according to some aspects of the technology.

FIG. 4 conceptually illustrates an environment 400 in which a BDRD system 402 can collect use data or demographic data from a utility and/or one or more consuming entities, for example, to confirm an amount of power reduction that occurred in response to a BDR notification dispatch. Environment 400 includes modules 404 (including a BDRD model and BDRD Data volume), and a Utility Co. system 406. Environment 400 also includes multiple power consuming entities, e.g., buildings 410, 422, and residence 416, which are associated with monitoring devices 412, 422 and a climate control device 418, respectively.

In the example environment 400 of FIG. 4, monitoring devices 412, 422, and climate control device 418 are communicatively coupled to BDRD system 402, via network 408. BDRD system 402 and Utility Co. system 406 are also communicatively coupled via network 408. Alternatively, BDRD system 402 and Utility Co. system 406 can also be in direct communication, for example, through a private network, or wireless communication means.

Each of buildings 410, 422, and residence 416 can provide power usage data/statistics to Utility Co. system 406, e.g., via a meter reading 415. Alternatively, for those entities having smart meter devices (e.g., AMI devices) such as buildings 410 and 422, usage data may be received automatically by Utility Co. system 406, e.g., via network 408.

In some instances, climate/power use data may be received, for example from an entity such as residence 416, via a climate control device 418, such as a smart thermostat, or other monitoring device.

Figure 5:
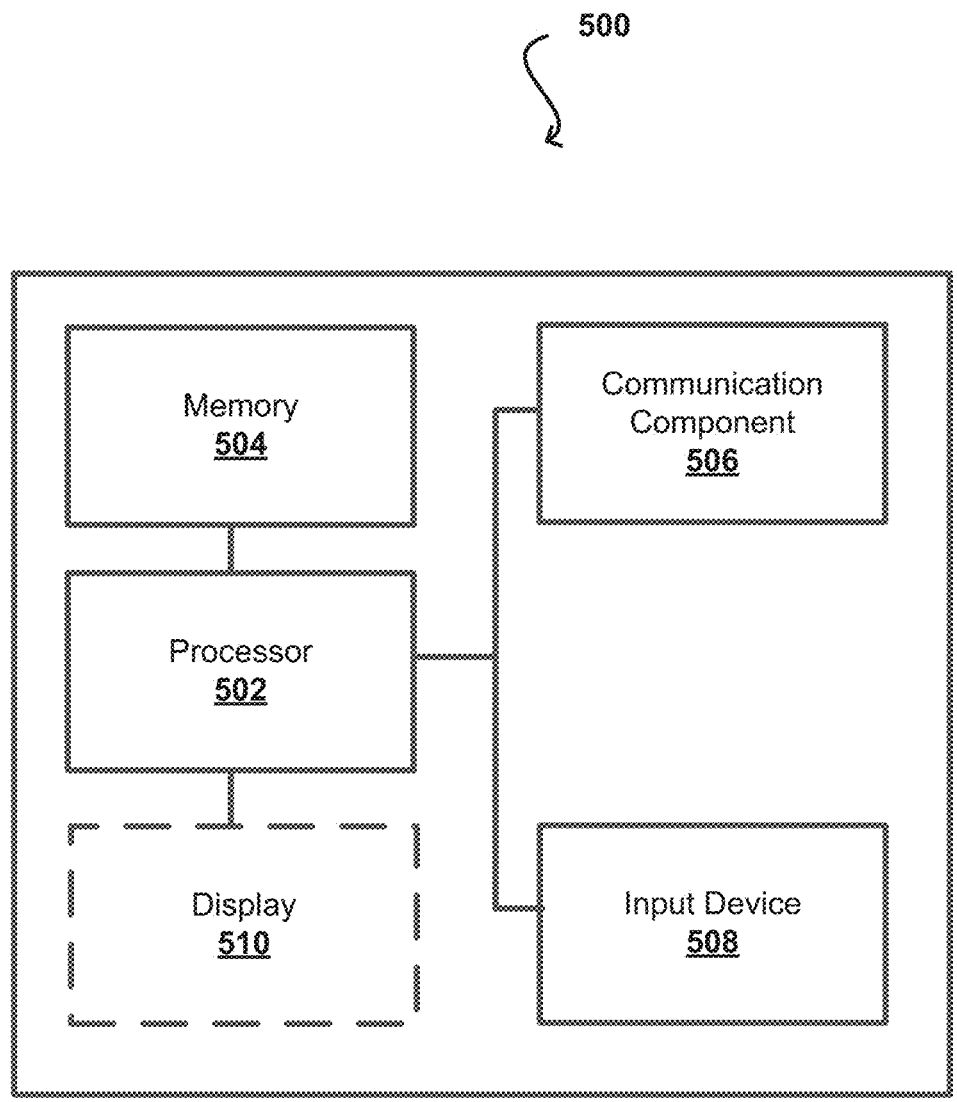
FIG. 5 illustrates an example of a processor-based system that may be used to implement a BDR dispatch system of the subject technology.

FIG. 5 illustrates an example configuration of components of a computing device 500, e.g., the BDRD system 402 of FIG. 4, according to certain aspects of the subject technology. In this example, computing device 500 includes processor 502 for executing instructions that can be stored in a memory device or element 504. The instructions may cause computing device 500 to execute computer-implemented methods and/or receive instructions. As would be apparent to one of ordinary skill in the art, computing device 500 can include many types of memory, data storage, or non-transitory computer-readable storage media, such as a first data storage for program instructions for execution by processor 502, a separate storage for usage history or user information, a removable memory for sharing information with other devices, etc.

In some aspects, computing device 500 can include one or more communication components 506, such as a Wi-Fi, Bluetooth®, radio frequency, near-field communication, wired, or wireless communication system. Computing device 500 can communicate with a network, such as the Internet, and may be able to communicate with other such devices, such AMI devices and/or smart thermostat devices.

As discussed above, computing device 500 can include at least one input element 508 able to receive conventional input from a user. Input element 508 can include, for example, a push button, touch pad, touch screen, wheel, joystick, keyboard, mouse, keypad, or any other such device or element whereby a user can input a command to device 500. In some implementations, however, such a device might not include any buttons at all, and might be controlled only through a combination of visual and/or audio commands, such that a user can control device 500 without having to be in physical contact. Computing device 500 includes display element 510, such as a touch screen or liquid crystal display (LCD).

The various embodiments can be implemented in a wide variety of operating environments, which in some cases can include one or more user computers, computing devices, and/or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method comprising:
receiving, by a processor of a computing device, a reduction request indicating a desired amount of a consumable resource for which consumption is to be reduced;
receiving, by the processor, a population indicator defining a set of consumers associated with the reduction request;
applying, by the processor, weighted factors of a behavioral demand response dispatch (BDRD) model to the set of consumers to identify a target user;
determining, by the processor using the BDRD model, (i) a communication channel for sending a demand reduction communication to the target user and (ii) a time for sending the demand reduction communication using the communication channel to the target user;
providing, by the processor, the demand reduction communication to the target user according to (i) the communication channel and (ii) the time for sending the demand reduction communication, wherein the demand reduction communication is sent to the target user at the time determined for sending;
measuring, by the processor, a reduction amount for the consumable resource that is consumed by the target user in response to the demand reduction communication;
updating, by the processor, the BDRD model based upon the reduction amount to create an updated BDRD model, wherein the updating comprises:
calculating a time delay as a time difference between i) a time at which the demand reduction communication is transmitted over a network to a computing device of the target user and ii) a starting time of a reduction period during which a reduction of resource consumption is requested; and
training the BDRD model to determine when to send subsequent demand reduction communications based upon the time delay; and
utilizing, by the processor, the updated BDRD model to select a target communication channel and a target time for sending a subsequent demand reduction communication.

2. The computer-implemented method of claim 1, wherein the determining a communication channel further comprises:
utilizing, by the processor, weighted factors, of the BDRD model trained using historic behavior demand response data, to determine the communication channel and the time for sending the demand reduction communication.

3. The computer-implemented method of claim 1, further comprising:
applying, by the processor, the weighted factors of the BDRD model to the set of consumers to identify one or more target users;
selecting, by the processor using the BDRD model, communication channels for each of one or more target users; and
selecting, by the processor using the BDRD model, a content type for each of the one or more target users.

4. The computer-implemented method of claim 3, wherein the demand reduction communication is provided using the respective communication channel for each of the one or more target users, and wherein each demand reduction communication is based on the content type for each of the one or more respective target users.

5. The computer-implemented method of claim 3, wherein the demand reduction communication provided to each of the one or more target users is based on geographic location information for each of the one or more target users.

6. The computer-implemented method of claim 3, wherein the demand reduction communication provided to each of the one or more target users is based on demographic information.

7. The computer-implemented method of claim 1, wherein the BDRD model is based at least in part on historic weather data for a geographic region associated with the target user.

8. A behavioral demand response dispatch system, comprising:
one or more processors; and
a computer-readable medium comprising instructions stored therein, which when executed by the processors, cause the processors to perform operations comprising:

receiving a reduction request indicating a desired amount of a consumable resource for which consumption is to be reduced;
receiving a population indicator defining a set of consumers associated with the reduction request;
receiving preference information associated with one or more users from among the set of consumers associated with the reduction request;
determining (i) a communication channel for sending a demand reduction communication and (ii) a time for sending the demand reduction communication using the communication channel to the target user based upon a behavioral demand response dispatch (BDRD) model and the preference information;
providing, using weighted factors of the BDRD model, the demand reduction communication to one or more target users from among the set of consumers associated with the reduction request based upon (i) the communication channel and (ii) the time for sending the demand reduction communication, wherein the demand reduction communication is sent to the target user at the time determined for sending;
measuring a reduction amount for the consumable resource that is reduced by a target user in response to the demand reduction communication;
updating the BDRD model based upon the reduction amount to create an updated BDRD model, wherein the updating comprises:
calculating a time delay as a time difference between i) a time at which the demand reduction communication is transmitted over a network to a computing device of the target user and ii) a starting time of a reduction period during which a reduction of resource consumption is requested; and
training the BDRD model to determine when to send subsequent demand reduction communications based upon the time delay; and
utilizing the updated BDRD model to select a target communication channel and a target time for sending a subsequent demand reduction communication.

9. The behavioral demand response dispatch system of claim 8, wherein the processors are further configured to perform operations comprising:
measuring reduction amounts for the consumable resource, wherein the reduction amounts are based on behaviors performed by a plurality of the target users.

10. The behavioral demand response dispatch system of claim 8, wherein the processors are further configured to perform operations comprising:
selecting the communication channel for the target user and selecting a second communication channel, different than the communication channel, for a second user.

11. The behavioral demand response dispatch system of claim 8, wherein the processors are further configured to perform operations comprising:
selecting a content type for the demand reduction communication based on the preference information associated with one or more users.

12. The behavioral demand response dispatch system of claim 8, wherein the demand reduction communication provided to each of the one or more target users is based on geographic location information for each of the one or more target users.

13. The behavioral demand response dispatch system of claim 8, wherein the BDRD model is based at least in part on historic weather data for a geographic region associated with at least one of the target users.

14. A non-transitory computer-readable storage medium comprising instructions stored therein, which when executed by one or more processors, cause the processors to perform operations comprising:
receiving a reduction request indicating a desired amount of a consumable resource for which consumption is to be reduced;
receiving a population indicator defining a set of consumers associated with the reduction request;
receiving preference information associated with one or more users from among the set of consumers associated with the reduction request;
determining a communication channel for sending (i) a demand reduction communication and (ii) a time for sending the demand reduction communication using the communication channel to the target user based upon a behavioral demand response dispatch (BDRD) model and the preference information;
providing, using weighted factors of the BDRD model, the demand reduction communication to one or more target users from among the set of consumers associated with the reduction request based upon (i) the communication channel and (ii) the time for sending the demand reduction communication, wherein the demand reduction communication is sent to the target user at the time determined for sending;
measuring a reduction amount for the consumable resource that is consumed by a target user in response to the demand reduction communication;
updating the BDRD model based upon the reduction amount to create an updated BDRD model, wherein the updating comprises:
calculating a time delay as a time difference between i) a time at which the demand reduction communication is transmitted over a network to a computing device of the target user and ii) a starting time of a reduction period during which a reduction of resource consumption is requested; and
training the BDRD model to determine when to send subsequent demand reduction communications based upon the time delay; and
utilizing the updated BDRD model to select a target communication channel and a target time for sending a subsequent demand reduction communication.

15. The non-transitory computer-readable storage medium of claim 14, wherein the processors are further configured to perform operations comprising:
measuring reduction amounts for the consumable resource, wherein the reduction amounts are based on behaviors performed by a plurality of the target users.

16. The non-transitory computer-readable storage medium of claim 14, wherein the processors are further configured to perform operations comprising:
selecting the communication channel for the target user and selecting a second communication channel, different than the communication channel, for a second user.

17. The non-transitory computer-readable storage medium of claim 14, wherein the processors are further configured to perform operations comprising:
selecting a content type for the demand reduction communication based on the preference information associated with one or more users.

18. The non-transitory computer-readable storage medium of claim 14, wherein the demand reduction communication provided to each of the one or more target users is based on geographic location information for each of the one or more target users.

19. The non-transitory computer-readable storage medium of claim 14, wherein the BDRD model is based at least in part on historic weather data for a geographic region associated with at least one of the target users.

20. The non-transitory computer-readable storage medium of claim 14, wherein the BDRD is used to determine the time for sending as a time at which the demand reduction communication is to be transmitted to the computing device of the target user.

* * * * *